US010133082B2

(12) United States Patent
Yang et al.

(10) Patent No.: US 10,133,082 B2
(45) Date of Patent: Nov. 20, 2018

(54) THREE DIMENSIONAL GRATING, COLOR FILTER SUBSTRATE, DISPLAY DEVICE AND CONTROL METHOD THEREOF

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Hailin Xue, Beijing (CN); Haisheng Wang, Beijing (CN); Wenqing Zhao, Beijing (CN); Renwei Guo, Beijing (CN); Peng Liu, Beijing (CN); Chung-Chun Chen, Beijing (CN); Jinghua Miao, Beijing (CN); Mubing Li, Beijing (CN); Changfeng Li, Beijing (CN); Yingming Liu, Beijing (CN); Weijie Zhao, Beijing (CN); Xiaoliang Ding, Beijing (CN); Wei Liu, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 15/105,632

(22) PCT Filed: Oct. 30, 2015

(86) PCT No.: PCT/CN2015/093302
§ 371 (c)(1),
(2) Date: Jun. 17, 2016

(87) PCT Pub. No.: WO2016/188034
PCT Pub. Date: Dec. 1, 2016

(65) Prior Publication Data
US 2017/0139222 A1    May 18, 2017

(30) Foreign Application Priority Data
May 25, 2015  (CN) .......................... 2015 1 0271863

(51) Int. Cl.
*G03B 27/22* (2006.01)
*G02F 1/163* (2006.01)
(Continued)

(52) U.S. Cl.
CPC ......... *G02B 27/2228* (2013.01); *G02F 1/155* (2013.01); *G02F 1/157* (2013.01);
(Continued)

(58) Field of Classification Search
CPC ..... G02B 27/2228; G02F 1/155; G02F 1/157; G02F 1/163; G02F 2201/30; G06F 3/045
See application file for complete search history.

(56) References Cited

U.S. PATENT DOCUMENTS 4,146,876 A * 3/1979 Arellano .................. C09K 9/02
345/105
8,113,901 B1   2/2012 Yeh et al.
(Continued)

FOREIGN PATENT DOCUMENTS

CN    202948233 U    5/2013
CN    103207456 A    7/2013
(Continued)

OTHER PUBLICATIONS

International Search Report and Written Opinion for International Application No. PCT/CN2015/093302, dated Feb. 15, 2016, 10 pages.
(Continued)

Primary Examiner — Ariel Balaoing
(74) Attorney, Agent, or Firm — Westman, Champlin & Koehler, P.A.

(57) ABSTRACT

A 3D grating, a color filter substrate, a display device and a control method thereof are provided. The 3D grating comprises: a first transparent electrode layer; a second transparent electrode layer; and an electrochromic material layer formed between the first transparent electrode layer and the second transparent electrode layer; wherein the first transparent electrode layer comprises a pattern of strip-shaped electrodes, which comprises a plurality of strip-shaped electrodes and an electrode wire electrically connected with each of the strip-shaped electrodes in the pattern; and wherein the electrochromic material layer is configured to be non-trans-
(Continued)

parent when it is in an electric field and to be transparent when it is not in an electric field, or the electrochromic material layer is configured to be transparent when it is in an electric field and to be non-transparent when it is not in an electric field.

18 Claims, 4 Drawing Sheets

(51) Int. Cl.
    *G02F 1/157*     (2006.01)
    *G02F 1/155*     (2006.01)
    *G06F 3/045*     (2006.01)
    *G02B 27/22*     (2018.01)

(52) U.S. Cl.
    CPC .............. *G02F 1/163* (2013.01); *G06F 3/045* (2013.01); *G02F 2201/30* (2013.01)

(56) References Cited

U.S. PATENT DOCUMENTS

| | | | |
|---|---|---|---|
| 8,220,891 B2 | 7/2012 | Oku | |
| 2006/0087499 A1* | 4/2006 | Chen | G02B 27/2214 345/204 |
| 2009/0315857 A1* | 12/2009 | Nishitani | G06F 3/0416 345/174 |
| 2010/0134865 A1* | 6/2010 | Higuchi | G02F 1/1521 359/273 |
| 2010/0271685 A1* | 10/2010 | Liu | G02B 27/2214 359/265 |
| 2011/0157086 A1* | 6/2011 | Ozeki | G06F 3/044 345/174 |
| 2012/0170115 A1* | 7/2012 | Zhang | G02B 27/2214 359/465 |
| 2012/0224246 A1* | 9/2012 | Yeh | G02F 1/1533 359/265 |
| 2015/0138136 A1 | 5/2015 | Long et al. | |
| 2016/0011428 A1 | 1/2016 | Li et al. | |

FOREIGN PATENT DOCUMENTS

| | | |
|---|---|---|
| CN | 103246072 A | 8/2013 |
| CN | 103324001 A | 9/2013 |
| CN | 104122671 A | 10/2014 |
| CN | 104123038 A | 10/2014 |
| CN | 104238223 A | 12/2014 |
| CN | 104834103 A | 8/2015 |
| JP | 2009-53391 A | 3/2009 |

OTHER PUBLICATIONS

English translation of Box No. V of the Written Opinion of the International Searching Authority for International Application No. PCT/CN2015/093302, dated Feb. 15, 2016, 2 pages.

First Office Action, including Search Report, for Chinese Patent Application No. 201510271863.7, dated Aug. 30, 2016, 12 pages.

* cited by examiner

THREE DIMENSIONAL GRATING, COLOR FILTER SUBSTRATE, DISPLAY DEVICE AND CONTROL METHOD THEREOF

CROSS-REFERENCE TO RELATED APPLICATION

This application is a Section 371 National Stage Application of International Application No. PCT/CN2015/093302, filed on 30 Oct. 2015, entitled "THREE DIMENSIONAL GRATING, COLOR FILTER SUBSTRATE, DISPLAY DEVICE AND CONTROL METHOD THEREOF", which has not yet published, and which claims priority to Chinese Application No. 201510271863.7, filed on 25 May 2015, incorporated herein by reference in their entirety.

TECHNICAL FIELD

The present invention generally relates to field of display technologies, and particularly, to a three dimensional grating, a color filter substrate, a display device and a control method thereof.

BACKGROUND

With development of display technologies, three-dimensional (3D) technologies become a trend for future displays. Currently, there are two main switching methods for switching between 2D display mode and 3D display mode of existing 2D/3D stereo display devices. One switching method is mechanically moving a lens on a display panel to realize the 2D/3D switch. However, a device implementing such a mechanical type switch is large and cannot be easily controlled due to influences from vibrations, moisture, dust and the likes. The other switching method is utilizing a liquid crystal lens, which may have different refractive indexes for ordinary light (o light) and extraordinary light (e light), to change polarization direction of light as so to finally realize the 2D/3D switch. However, such a switch method has the following shortcomings of complicated device, high cost for the liquid crystal lens, narrow viewing angle, narrow operating temperature range of liquid crystal molecules, and the likes.

SUMMARY

The present invention has been made to overcome or alleviate at least one aspect of the above mentioned disadvantages.

According to one aspect of the disclosure, there is provided a 3D grating, which comprises: a first transparent electrode layer; a second transparent electrode layer; and an electrochromic material layer formed between the first transparent electrode layer and the second transparent electrode layer; wherein the first transparent electrode layer comprises a pattern of strip-shaped electrodes, the pattern of strip-shaped electrodes comprising a plurality of strip-shaped electrodes and an electrode wire electrically connected with each of the strip-shaped electrodes in the pattern of strip-shaped electrodes; and wherein the electrochromic material layer is configured to be non-transparent when it is in an electric field and to be transparent when it is not in an electric field, or, the electrochromic material layer is configured to be transparent when it is in an electric field and to be non-transparent when it is not in an electric field.

In an embodiment, the 3D grating may further comprises at least one touch signal detecting terminal disposed on the second transparent electrode layer.

In an embodiment, each of the first transparent electrode layer and the second transparent electrode layer may comprise two patterns of strip-shaped electrodes, the strip-shaped electrodes of each of the patterns of strip-shaped electrodes being electrically connected by a corresponding electrode wire; in each of the transparent electrode layers, the strip-shaped electrodes of one of the two patterns of strip-shaped electrodes and the strip-shaped electrodes of the other one of the two patterns of strip-shaped electrodes are alternately arranged; and the strip-shaped electrodes in the first transparent electrode layer are perpendicular to the strip-shaped electrodes in the second transparent electrode layer.

In an embodiment, the second transparent electrode layer may be a plate-shaped electrode disposed at a light-exiting side of the first transparent electrode layer.

In an embodiment, the at least one touch signal detecting terminal may comprise four touch signal detecting terminals disposed at four corners of the plate-shaped electrode respectively.

In an embodiment, the second transparent electrode layer may comprise another pattern of strip-shaped electrodes, and orthographic projections of the strip-shaped electrodes of the second transparent electrode on the surface of the electrochromic material layer may be overlapped with orthographic projections of the strip-shaped electrodes of the first transparent electrode on the surface of the electrochromic material layer respectively.

In an embodiment, the at least one touch signal detecting terminal may comprise four touch signal detecting terminals, which are disposed at either end of each of two outermost strip-shaped electrodes of the second transparent electrode layer respectively; and ends of the strip-shaped electrodes of the second transparent electrode layer at the same side are electrically connected by a corresponding electrode wire to two of the touch signal detecting terminals at the side.

In an embodiment, the strip-shaped electrodes and the electrode wire in each of the transparent electrode layers may be formed of the same material through the same process.

In an embodiment, the electrode wire may be a metal wire.

According to another aspect of the disclosure, there is provided a color filter substrate, which comprises a substrate and a color filter layer formed on the substrate, wherein the color filter layer comprises a 3D grating formed on a light-exiting side of the color filter layer, and the 3D grating may be the 3D grating according to any one of the above embodiments.

In an embodiment of the color filter substrate, each of strip-shaped electrodes of the pattern of strip-shaped electrode may shield a left half of a subpixel of a left-eye image and a right half of a subpixel of a right-eye image.

In an embodiment of the color filter substrate, the 3D grating is formed on the substrate through a patterning process.

According to a further aspect of the disclosure, there is provided a method of manufacturing a 3D grating, which comprises:

forming a first transparent electrode layer;

forming an electrochromic material layer on the first transparent electrode layer; and forming a second transparent electrode layer on the electrochromic material layer;

wherein the first transparent electrode layer comprises a pattern of strip-shaped electrodes, the pattern of strip-shaped electrodes comprising a plurality of strip-shaped electrodes and an electrode wire connected with the plurality of strip-shaped electrodes of the pattern of strip-shaped electrodes; and wherein the electrochromic material layer is configured to be non-transparent when it is in an electric field and to be transparent when it is not in an electric field, or the electrochromic material layer is configured to be transparent when it is in an electric field and to be non-transparent when it is not in an electric field.

In an embodiment of the method, each of the first transparent electrode layer and the second transparent electrode layer may comprise two patterns of strip-shaped electrodes, the strip-shaped electrodes of each of the patterns of strip-shaped electrodes being electrically connected by a corresponding electrode wire; in each of the transparent electrode layers, the strip-shaped electrodes of one of the two patterns of strip-shaped electrodes and the strip-shaped electrodes of the other one of the two patterns of strip-shaped electrodes are alternately arranged; and the strip-shaped electrodes in the first transparent electrode layer are perpendicular to the strip-shaped electrodes in the second transparent electrode layer.

In an embodiment of the method, the steps of forming the first transparent electrode layer, the electrochromic material layer and the second transparent electrode layer may comprise: forming a plurality of strip-shaped electrodes of the first transparent electrode layer; depositing the electrochromic material layer on the first transparent electrode layer; forming a plurality of strip-shaped electrodes of the second transparent electrode layer on the deposited electrochromic material layer; forming an insulation material layer covering the first transparent electrode layer, the electrochromic material layer and the second transparent electrode layer; etching off portions of the insulation material layer at positions where the electrode wires are to be formed in the second transparent electrode layer and etching off portions of the insulation material layer and portions of the electrochromic material layer at positions where the electrode wires are to be formed in the first transparent electrode layer to form corresponding via holes for the electrode wires; and depositing a metal material to file the via holes to obtain the electrode wires in the second transparent electrode layer and the electrode wires in the second transparent electrode layer.

In an embodiment of the method, the strip-shaped electrodes and the electrode wire in the same transparent electrode layer may be formed simultaneously through the same process.

In an embodiment of the method, the first transparent electrode layer, the second transparent electrode layer and the electrochromic material layer may be formed on the substrate through a patterning process.

According to a still further aspect of the disclosure, there is provided a method of manufacturing a color filter substrate comprising:

forming a color filter layer on a substrate; and forming a 3D grating on a light-exiting side of the color filter layer through the method according to any one of the above embodiments.

Preferably, the step of forming the 3D grating may comprise forming the 3D grating on the substrate through a patterning process.

According to a still further aspect of the disclosure, there is provided a display device, comprising the color filter substrate according to any one of the above embodiments.

According to a still further aspect of the disclosure, there is provided a display control method for controlling the display device to switch between a 2D display mode and a 3D display mode, the method comprising:

in the 3D display mode, controlling voltages applied on the first transparent electrode layer and the second transparent electrode layer, such that the whole electrochromic material layer presents transparent portions and non-transparent portions that are alternately distributed; and in the 2D display mode, controlling the voltages applied on the first transparent electrode layer and the second transparent electrode layer, such that the whole electrochromic material layer becomes transparent.

In an embodiment of the display control method, in the 3D display mode, a voltage applied on the electrode wire is controlled to generate an electric field between the second transparent electrode layer and the strip-shaped electrodes of the first transparent electrode layer, such that portions of the electrochromic material layer at position corresponding to the strip-shaped electrodes become non-transparent from transparent to form a grating pattern; and in the 2D display mode, the voltage applied on the electrode wire is controlled such that no electric field is formed between the second transparent electrode layer and the strip-shaped electrodes of the first transparent electrode layer and thereby the whole electrochromic material layer becomes transparent.

In an embodiment of the display control method, in the 3D display mode, a voltage applied on the electrode wire is controlled to generate an electric field between the second transparent electrode layer and the strip-shaped electrodes of the first transparent electrode layer, such that portions of the electrochromic material layer at positions corresponding to the strip-shaped electrodes become transparent from non-transparent to form a grating pattern; and in the 2D display mode, the voltage applied on the electrode wire controlled such that no electric field is formed between the second transparent electrode layer and the strip-shaped electrodes of the first transparent electrode layer and thereby the whole electrochromic material layer becomes transparent.

In an embodiment of the display control method, in the condition that each of the first transparent electrode layer and the second transparent electrode layer of the 3D grating comprises two patterns of strip-shaped electrodes, the display control method comprises: controlling voltages applied on each of the electrode wires in the 3D display mode, such that no electric field is generated between strip-shaped electrodes of one pattern of strip-shaped electrodes of one of the first and the second transparent electrode layers and strip-shaped electrodes of the two patterns of strip-shaped electrodes of the other one of the first and the second transparent electrode layers, and an electric field is generated between strip-shaped electrodes of the other pattern of strip-shaped electrodes of the one of the first and the second transparent electrode layers and strip-shaped electrodes of the two patterns of strip-shaped electrodes of the other one of the first and the second transparent electrode layers.

In an embodiment, the display control method may further comprise:

detecting a viewing direction in which a user watches the display device in the 3D display mode;

determining the first transparent electrode layer as the one of the first and the second transparent electrode layers and the second transparent electrode layer as the other one of the first and the second transparent electrode layers, when the viewing direction is consistent with a length direction of the strip-shaped electrodes of the first transparent electrode layer; and determining the second transparent electrode layer as the one of the first and the second transparent electrode layers and the first transparent electrode layer as the other one of the first and the second transparent electrode layers, when the viewing direction is consistent with a length direction of the strip-shaped electrodes of the second transparent electrode layer.

In the 3D grating provided by the disclosure, through controlling a state of voltages applied to the first transparent electrode layer and the second transparent electrode layer, the 3D grating may be entirely transparent to achieve a 2D display, or the 3D grating may be partially non-transparent to be used as a grating to achieve a 3D display. With the 3D grating provided by the disclosure, a corresponding display device may be simple in structure, and a switch between 2D display and 3D display can be achieved easily.

DETAILED DESCRIPTION OF PREFERRED EMBODIMENTS

Embodiments of this disclosure will be clearly and fully described in conjunction with the appended drawings, such that objects, technical solutions and advantages of embodiments of the invention will be more apparent. Obviously, the embodiments described hereinafter are not all but a part of possible ways of implementing the concept of this disclosure. All other embodiments made by those ordinary skilled in the art based on the embodiments of the disclosure without an inventive work shall fall within the scope of the disclosure.

According to a general concept of the disclosure, there is provided a 3D grating and a color filter substrate and a display device comprising the 3D grating. The 3D grating comprises a first transparent electrode layer, a second transparent electrode layer, and an electrochromic material layer formed between the first transparent electrode layer and the second transparent electrode layer; wherein the first transparent electrode layer comprises a pattern of strip-shaped electrodes, the pattern of strip-shaped electrodes comprising a plurality of strip-shaped electrodes and an electrode wire electrically connected with each of the strip-shaped electrodes in the pattern of strip-shaped electrodes. In an example the electrochromic material layer is configured to be non-transparent when it is in an electric field and to be transparent when it is not in an electric field. For example, the electrochromic material layer may be made of a transparent material, and it will become non-transparent when it is in an electric field. In this condition, the electrochromic material layer is at least arranged on the strip-shaped electrodes of the first transparent electrode layer, and gaps between adjacent strip-shaped electrodes may be filled with the electrochromic material layer or other transparent material, or the gaps may not be filled with any material, so as to ensure that the gaps are transparent. Or, the electrochromic material layer is configured to be transparent when it is in an electric field and to be non-transparent when it is not in an electric field. For example, the electrochromic material layer may be made of a non-transparent material, and it will become transparent when it is in an electric field. In this condition, the electrochromic material layer is only formed on the strip-shaped electrodes of the first transparent electrode layer, and gaps between adjacent strip-shaped electrodes are transparent, for example, the gaps may be filled with a transparent material or the gaps may not be filled with any material.

In the disclosure, through controlling a state of voltages applied to the first transparent electrode layer and the second transparent electrode layer, the 3D grating may be entirely transparent to achieve a 2D display, or the 3D grating may be partially non-transparent to be used as a grating to achieve a 3D display. With the 3D grating provided by the disclosure, a corresponding display device may be simple in structure, and a switch between 2D display and 3D display can be achieved easily.

In another aspect, the disclosure further provides a display control method for controlling a display device comprising the 3D grating to switch between a 2D display mode and a 3D display mode, and the method comprises:

in the 3D display mode, controlling voltages applied on the first transparent electrode layer and the second transparent electrode layer, such that the whole electrochromic material layer presents transparent portions and non-transparent portions that are alternately distributed; and in the 2D display mode, controlling the voltages applied on the first transparent electrode layer and the second transparent electrode layer, such that the whole electrochromic material layer becomes transparent.

Exemplarily, the 3D grating disclosed herein may be formed in a light-exiting direction or at a light-exiting side of the color filter substrate at any position, and may have different types of structures. Hereinafter, a 3D grating, a color filter substrate including the 3D grating, a display device including the 3D grating and a display control method provided in embodiments of the disclosure will be set forth by way of illustration in conjunction with the appended drawings.

First Embodiment

Figure 1:
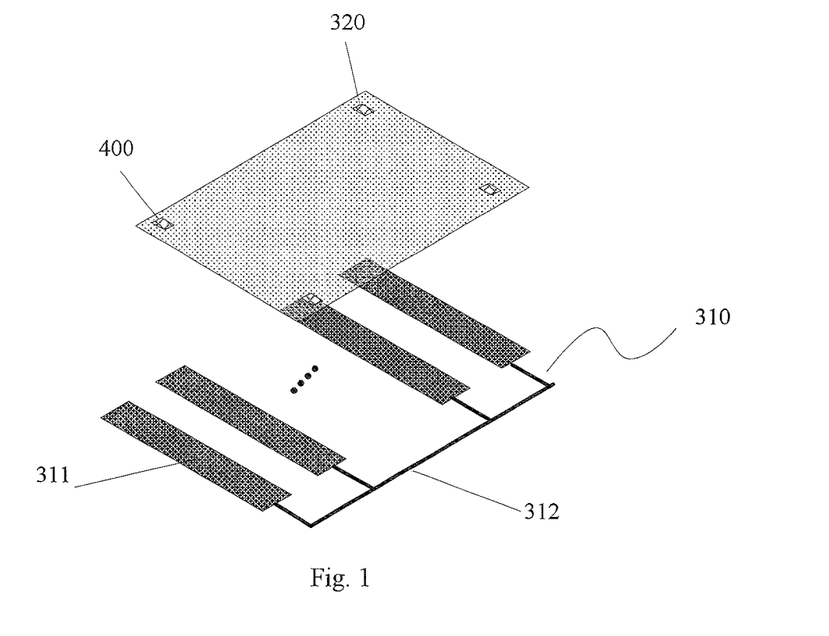
FIG. 1 is a structural schematic drawing showing a 3D grating according to a first embodiment of the invention.
Figure 2:
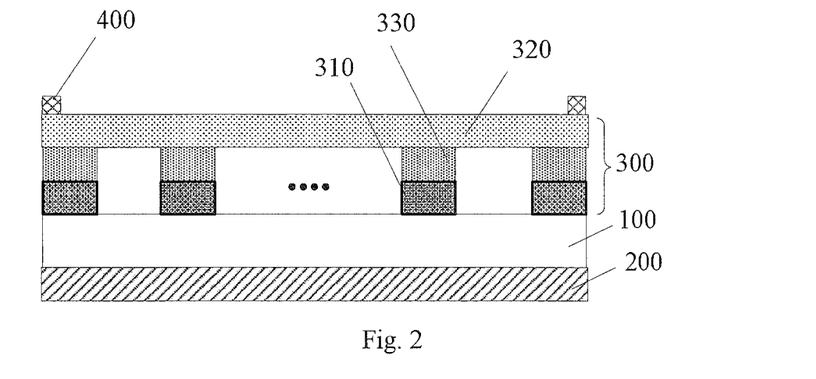
FIG. 2 is a schematic structural drawing showing a color filter substrate comprising the 3D grating according to the first embodiment of the invention.

The first embodiment of the disclosure provides a 3D grating. As shown in FIGS. 1 and 2, the 3D grating 300 includes a first transparent electrode layer 310, a second transparent electrode layer 320 formed above the first transparent electrode layer 310 (in a light-exiting direction), and an electrochromic material layer 330 formed between the first transparent electrode layer 310 and the second transparent electrode layer 320. The first transparent electrode layer 310 includes a pattern of strip-shaped electrodes, which includes a plurality of strip-shaped electrodes 311 and an electrode wire 312 electrically connected with each of the strip-shaped electrodes in the pattern of strip-shaped electrodes. Preferably, the strip-shaped electrodes 311 are equidistantly spaced from one another. The second transparent electrode layer 320 is a one-piece plate-shaped electrode. The electrochromic material layer 330 is non-transparent when it is in an electric field, and is transparent when it is not in an electric field, and vice versa.

When controlling a display device comprising the 3D grating according to the first embodiment, a display controlling method may include:

in a 3D display mode, applying voltages on the first transparent electrode layer 310 and the second transparent electrode layer 320 to generate a respective electric field for each of the strip-like electrodes, that is, an electric field being generated between each of the strip-like electrodes and the second transparent electrode layer 320 to make portions of the electrochromic material layer between the strip-like electrodes and the second transparent electrode layer 320 become non-transparent, such that the electrochromic material layer 330 as a whole presents a grating pattern including alternately-arranged transparent portions and non-transparent portions and thereby a naked-eye 3D display is realized; and in a 2D display mode, applying no voltage or applying an identical voltage on the first transparent electrode layer 310 and the second transparent electrode layer 320, such that the electrochromic material layer as a whole is transparent and thereby a 2D display is realized.

From the above, in the embodiment of the disclosure, a switch between 2D display mode and a 3D display mode may be realized through changing the voltages applied to the first transparent electrode layer 310 and the second transparent electrode layer 320, and a control process can be more easily realized compared with prior arts, which realizes a switch between 2D display mode and 3D displays in a mechanical manner or through using a liquid-crystal-lens. Moreover, as compared with a display device which realizes the switch between 2D display mode and 3D displays mode in the mechanical manner or the liquid-crystal-lens manner in prior arts, a display device including the 3D grating according to the embodiment of the disclosure has a simpler structure.

Further, the 3D grating according to the embodiment of the disclosure may further include at least one touch signal detecting terminal disposed on the second transparent electrode layer, such that the second transparent electrode layer may also be used as a touch electrode. In the embodiment shown in FIG. 1, the second transparent electrode layer 320 is formed as a one-piece plate-shaped electrode, for example, a rectangular plate-shaped electrode. In this condition, the 3D grating may include 4 touch signal detecting terminals 400, which may be disposed at four corners of this plate-shaped electrode. In this condition, the electrode layer 320 may also be used as a touch electrode, and value of an electric current in the electrode may be detected through the touch signal detecting terminals 400, thereby achieving resistance type touch detection. In this way, an additional layer of detecting electrode may be avoided, and thereby a thickness of a corresponding display device may be reduced and manufacturing process may be simplified.

Exemplarily, the first transparent electrode layer 310 and/or the second transparent electrode layer 320 herein may be formed of a transparent material such as ITO, which will not be specifically defined in the embodiment of the disclosure.

In one example, in the first transparent electrode layer 310, the strip-shaped electrodes 311 and the electrode wire 312 may be formed of the same material, and in this condition, the strip-shaped electrodes 311 and the electrode wire 312 may be formed through a single process, thereby decreasing complexity of manufacturing process.

Alternatively, the electrode wire 312 may be a metal wire, which is useful to reduce resistivity. In this condition, the metal electrode wire 312 and the strip-shaped electrodes 311 may be manufactured in different processes.

The above electrochromic material layer 330 may include an inorganic material such as $WO_3$, $Ni(OH)_2$, Prussian blue and the likes, or an organic material such as polyaniline, viologen, rare earth phthaloeyanin and the likes.

Referring to FIG. 2, a schematic structural drawing of a color filter substrate comprising the 3D grating according to the first embodiment of the disclosure is provided. The color filter substrate mainly includes a substrate 100, a color filter layer 200 formed on a lower surface of the substrate 100, and a 3D grating 300 formed on an upper surface of the substrate 100.

Exemplarily, the 3D grating 300 may be formed on the substrate through a patterning process. In such a way, on one hand, an entire cell thickness of a display device may be reduced, and on the other hand, an cell assembling process may be omitted due to the patterning process compared with a process including manufacturing a 3D grating and disposing a manufactured 3D grating at a light-exiting side of the color filter layer, thereby decreasing complexity of manufacturing.

Figure 3:
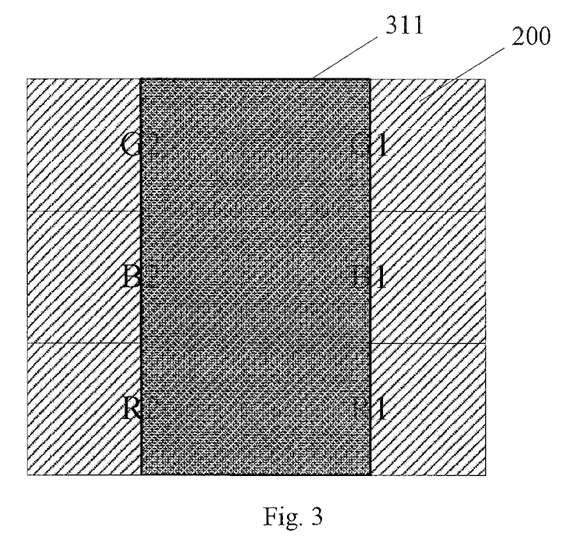
FIG. 3 is a schematic structural drawing showing a portion of the color filter substrate shown in FIG. 2.

Referring to FIG. 3, in one example, each of the strip-shaped electrodes 311 may block or shield left halves of subpixels (indicated by G1, B1 and R1 in the drawing) of a left-eye image and right halves of subpixels (indicated by G2, B2 and R2 in the drawing) of a right-eye image, such that a 3D display may be realized easily.

Obviously, although the embodiment is described by an example in which the color filter layer and the 3D grating are arranged on either side/surface of the substrate, the 3D grating according to the disclosure is not limited thereto actually. Provided the 3D grating is located at the light-exiting side or in the light-exiting direction of the color filter layer, a corresponding technical solution shall fall within the scope of the disclosure.

Second Embodiment

Figure 4:
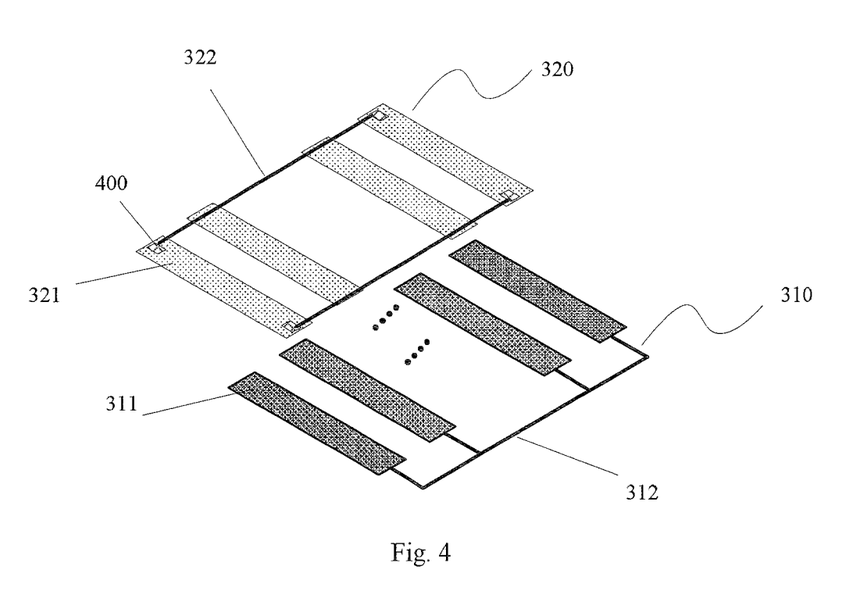
FIG. 4 is a schematic structural drawing showing a 3D grating according to a second embodiment of the invention.
Figure 5:
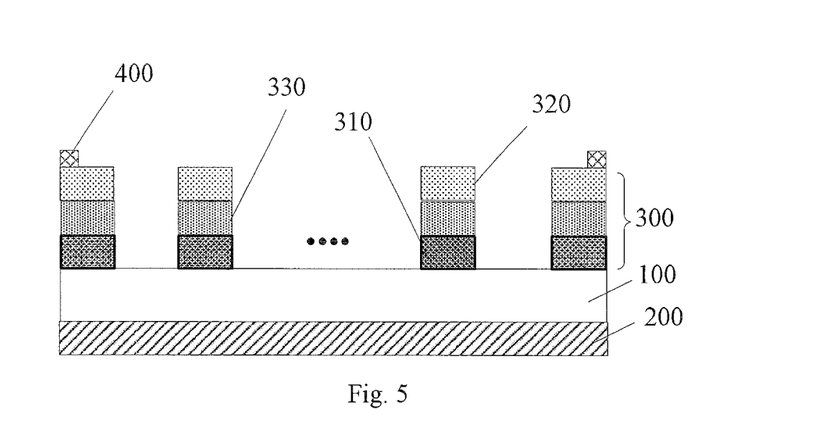
FIG. 5 is a schematic structural drawing showing a color filter substrate comprising the 3D grating according to the second embodiment of the invention.

As shown in FIGS. 4 and 5, a difference between the second embodiment of the disclosure and the first embodiment lies in that, in the 3D grating of the second embodiment, instead of being formed as an one-piece plate-shaped electrode, the second transparent electrode 320 also includes a plurality of strip-shaped electrodes 321 and an electrode wire 322 electrically connected with each of the strip-shaped electrodes 321. Preferably, the strip-shaped electrodes 321 are equidistantly spaced from one another, and positions of the strip-shaped electrodes 321 of the second transparent electrode 320 correspond to positions of the strip-shaped electrodes 311 of the first transparent electrode 310 respectively. That is, orthographic projections of the strip-shaped electrodes 321 of the second transparent electrode 320 on the surface of the electrochromic material layer 330 are overlapped with orthographic projections of the strip-shaped electrodes 311 of the first transparent electrode 310 on the surface of the electrochromic material layer 330, for example, as shown in FIG. 5.

In one example, two strip-shaped electrodes 321 at edges of the electrochromic material layer 330 may each include two touch signal detecting terminals 400 which are located at either end thereof respectively. Ends of the strip-shaped electrodes 321 at the same side may be connected to the touch signal detecting terminals at the same side of the two strip-shaped electrodes 321 at edges through the electrode wire 322, thereby also achieving resistance-type touch detection.

The rest of the structure of the 3D grating according to the second embodiment may be similar to those of the 3D according to the first embodiment, and a corresponding display control method thereof may also be similar to the method described in conjunction with the first embodiment, thus, a detailed description thereof is omitted.

Third Embodiment

Figure 6:
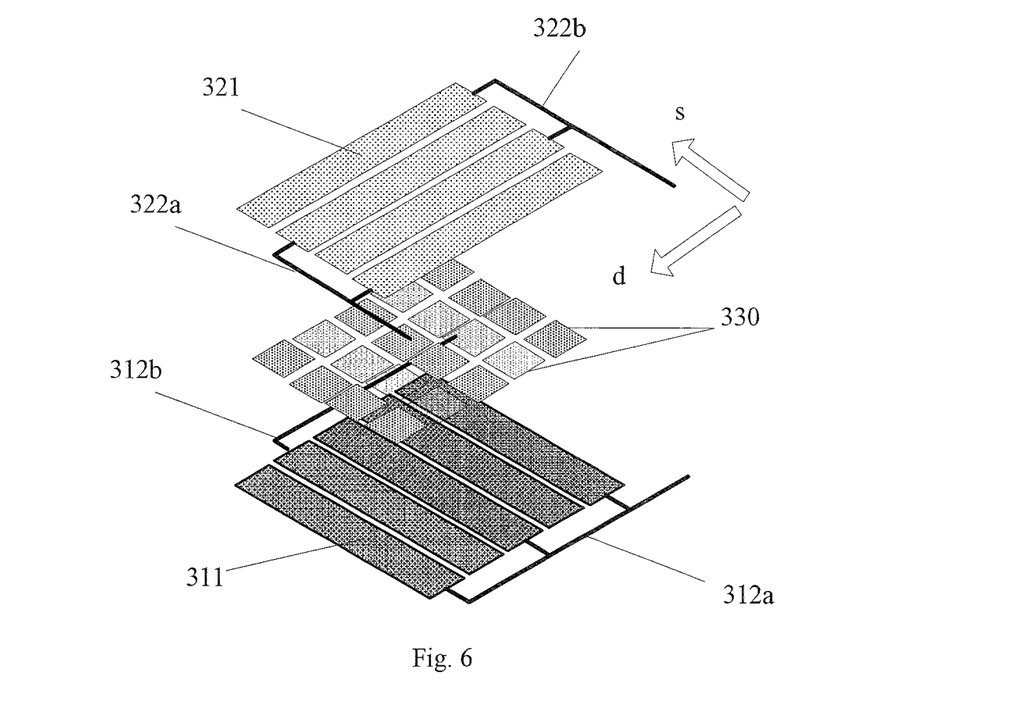
FIG. 6 and FIG. 7 are schematic structural drawings showing a 3D grating according to a third embodiment of the invention.
Figure 7:
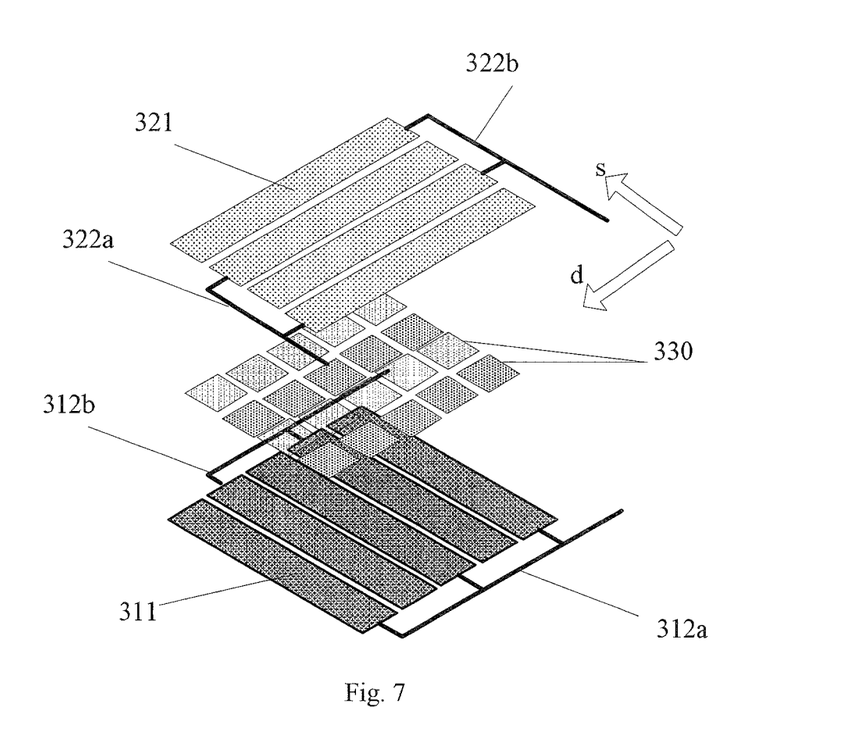
Figure 8:
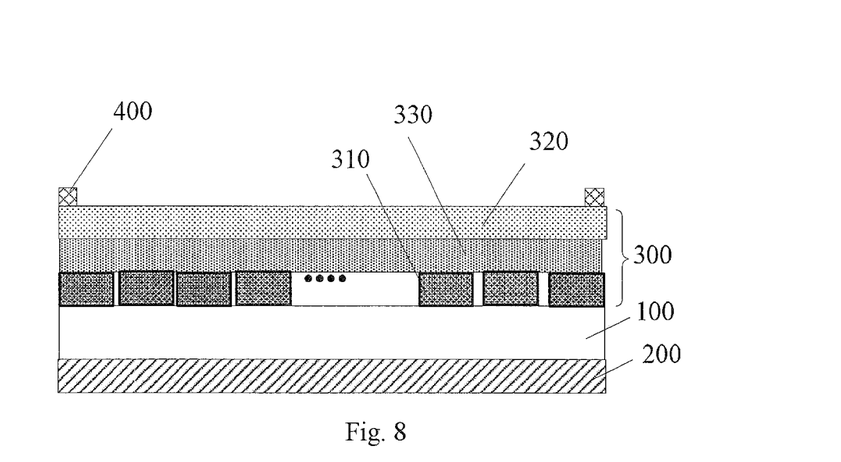
FIG. 8 is a schematic structural drawing showing a color filter substrate comprising the 3D grating according to the third embodiment of the invention.

As shown in FIGS. 6, 7 and 8, a difference between the third embodiment of the disclosure and the first embodiment lies in that, in the 3D grating of the third embodiment, each of the first transparent electrode 310 and the second transparent electrode 320 includes a plurality of strip-shaped electrodes, and the strip-shaped electrodes 311 of the first transparent electrode 310 are arranged along a direction d with their length direction in a direction s, while the strip-shaped electrodes 321 of the first transparent electrode 320 are arranged along the direction s with their length direction in the direction d, wherein the direction s is perpendicular to the direction d. In one example, the second transparent electrode 320 may also include touch signal detecting terminals 400, as shown in FIG. 8.

In an example, in the first transparent electrode 310, a part of the strip-shaped electrodes 311 are connected with an electrode wire 312*a* to form a first pattern of strip-shaped electrodes, the other part of the strip-shaped electrodes 311 are connected with a another electrode wire 312*b* to form a second pattern of strip-shaped electrodes, and the strip-shaped electrodes connected with the electrode wire 312*a* and the strip-shaped electrodes connected with the electrode wire 312*b* are alternately arranged (i.e., strip-shaped electrodes that are numbered by odd numbers in a sequence of the strip-shaped electrodes are connected with one electrode wire, and strip-shaped electrodes that are numbered by even numbers in a sequence of the strip-shaped electrodes are connected with the another electrode wire). Correspondingly, in the second transparent electrode 320, a part of the strip-shaped electrodes 321 are connected with an electrode wire 322*a* to form a third pattern of strip-shaped electrodes, the other part of the strip-shaped electrodes 321 are connected with another electrode wire 322*b* to form a fourth pattern of strip-shaped electrodes, and the strip-shaped electrodes connected with the electrode wire 322*a* and the strip-shaped electrodes connected with the electrode wire 322*b* are also alternately arranged.

The rest of the structure of the 3D grating according to the third embodiment may be similar to those of the 3D according to the first embodiment, thus a detailed description thereof is omitted.

A display control method of a display device comprising the 3D grating according to the third embodiment may be similar to the display control method of the display device comprising the 3D grating according to the first embodiment. Additionally, the display control method of the display device comprising the 3D grating according to the third embodiment may further include: detecting a viewing direction in which a user watches the display device in 3D display mode, and performing a 3D display in the detected viewing direction. Specifically, if the viewing direction is consistent with the s direction, a naked-eye 3D display is performed in the s direction. In this condition, as shown in FIG. 6, voltages applied to each of the electrode wires may be controlled such that a voltage applied to strip-shaped electrodes 311 of one pattern of strip-shaped electrodes, such as the second pattern of strip-shaped electrodes, of the first transparent electrode layer 310 is in consistent with or the same as a voltage applied to strip-shaped electrodes of both patterns of strip-shaped electrodes of the second transparent electrode layer 320 and thus no electric field is generated therebetween, while a voltage applied to strip-shaped electrodes 311 of the first pattern of strip-shaped electrodes of the first transparent electrode layer 310 is not the same as or is different from a voltage applied to strip-shaped electrodes of both patterns of strip-shaped electrodes of the second transparent electrode layer 320 and thus an electric field is generated therebetween. In such a manner, a grating corresponding to the strip-shaped electrodes of the first pattern of strip-shaped electrodes of the first transparent electrode layer 310 is formed in the s direction. Accordingly, if the view direction is the same as the d direction, a naked-eye 3D display may be performed in the d direction. In this condition, as shown in FIG. 7, voltages applied to each of the electrode wires may be controlled such that a voltage applied to strip-shaped electrodes 321 of one pattern of strip-shaped electrodes, such as the fourth pattern of strip-shaped electrodes, of the second transparent electrode layer 320 is in consistent with or the same as a voltage applied to strip-shaped electrodes of both patterns of strip-shaped electrodes of the first transparent electrode layer 310 and thus no electric field is generated therebetween, while a voltage applied to strip-shaped electrodes 321 of the third pattern of strip-shaped electrodes of the second transparent electrode layer 320 is not the same as or is different from a voltage applied to strip-shaped electrodes of both patterns of strip-shaped electrodes of the first transparent electrode layer 310 and thus an electric field is generated therebetween. In such a manner, a grating corresponding to the strip-shaped electrodes of the third pattern of strip-shaped electrodes of the second transparent electrode layer 320 is formed in the d direction.

From the above, a naked-eye 3D display in two directions may be realized by the 3D grating according to the third embodiment of the disclosure.

In the second and third embodiments as described above, similar to the first embodiment, each of the electrode wires may be formed of the same material as that of the strip-shaped electrodes and they may be manufactured in the same process. Alternatively, each of the electrode wires may be formed of a material different from that of the strip-shaped electrodes, such as a metal material, and may be formed in a different process from the strip-shaped electrodes. In this manner, all the metal electrode wires may be formed in a single process. In such a manner, complexity of manufacturing may be decreased.

In another aspect, the disclosure provides a method of manufacturing a 3D grating, which may be used for manufacturing the 3D grating according to any one of the embodiments described above. Specifically, the method may include steps of:

forming a first transparent electrode layer;

forming an electrochromic material layer on the first transparent electrode layer; and forming a second transparent electrode layer on the electrochromic material layer;

wherein the first transparent electrode layer includes a pattern of strip-shaped electrodes including a plurality of strip-shaped electrodes and an electrode wire connected with each of the plurality of strip-shaped electrodes of the pattern of strip-shaped electrodes; and wherein the electrochromic material layer is configured to be non-transparent when it is in an electric field and to be transparent when it is not in an electric field, and alternatively, the electrochromic material layer is configured to be transparent when it is in an electric field and to be non-transparent when it is not in an electric field.

In the color filter substrate comprising the 3D grating manufactured by the method according to the disclosure, the strip-shaped electrodes may become transparent to achieve a 2D display or become non-transparent to achieve a 3D display through controlling a state of voltages applied to the first transparent electrode layer and the second transparent electrode layer. With the 3D grating provided by the disclosure, a structure of a corresponding display device may be simple, and switch between 2D display and 3D display may be realized easily.

In an example, when the method of manufacturing a 3D grating is used to manufacturing the 3D grating according to the above embodiments, the method may further include a step of forming a touch signal detecting terminal on the second transparent electrode layer. A specific process of forming the touch signal detecting terminal pertains to prior art and will not be described in detail in this disclosure.

Exemplarily, when the method of manufacturing a 3D grating is used to manufacturing the 3D grating according to the third embodiment and the electrode wire is made of a metal material, the method may include steps of:

forming a plurality of strip-shaped electrodes of the first transparent electrode layer;

depositing an electrochromic material layer on the first transparent electrode layer; and forming a plurality of strip-shaped electrodes of the second transparent electrode layer on the deposited electrochromic material layer;

forming an insulation material layer on a structure which is obtained after the plurality of strip-shaped electrodes in the second transparent electrode layer has been formed;

etching off portions of the insulation material layer at positions where the electrode wires are to be formed in the second transparent electrode layer and etching off portions of the insulation material layer and portions of the electrochromic material layer at positions where the electrode wires are to be formed in the first transparent electrode layer, so as to form corresponding via holes for the electrode wires; and depositing a metal material on a structure that is obtained after the via holes have been formed, to obtain the electrode wires in the second transparent electrode layer and the electrode wires in the first transparent electrode layer.

In such a manner, the electrode wires in the first and the second transparent electrode layers may be formed through a single patterning process, such that complexity of manufacturing process may be decreased.

In one example, if all the electrode wires are formed of the same material as that of the strip-shaped electrodes, the strip-shaped electrodes and the electrode wire in the same transparent electrode layer may be formed simultaneously through a single process.

In another aspect, the disclosure further provides a method of manufacturing a color filter substrate. The method includes:

forming a color filter layer on a substrate; and forming a 3D grating through the 3D manufacturing method described above at a light-exiting side of the substrate.

A specific process of forming the color filter layer pertains to prior art, which will not be described in this disclosure.

As an alternative, when manufacturing the above 3D grating, the 3D grating may be formed on the substrate through a patterning process.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A 3D grating, comprising:
   a first transparent electrode layer;
   a second transparent electrode layer; and
   an electrochromic material layer formed between the first transparent electrode layer and the second transparent electrode layer;
   wherein the first transparent electrode layer comprises a pattern of strip-shaped electrodes, the pattern of strip-shaped electrodes comprising a plurality of strip-shaped electrodes and an electrode wire electrically connected with each of the strip-shaped electrodes in the pattern of strip-shaped electrodes; and
   wherein the electrochromic material layer is configured to be non-transparent when it is in an electric field and to be transparent when it is not in an electric field, or, the electrochromic material layer is configured to be transparent when it is in an electric field and to be non-transparent when it is not in an electric field,
   each of the first transparent electrode layer and the second transparent electrode layer comprises two patterns of strip-shaped electrodes, the strip-shaped electrodes of each of the patterns of strip-shaped electrodes being electrically connected by a corresponding electrode wire;
   in each of the transparent electrode layers, the strip-shaped electrodes of one of the two patterns of strip-shaped electrodes and the strip-shaped electrodes of the other one of the two patterns of strip-shaped electrodes are alternately arranged; and
   the strip-shaped electrodes in the first transparent electrode layer are perpendicular to the strip-shaped electrodes in the second transparent electrode layer.

2. The 3D grating according to claim 1, further comprising at least one touch signal detecting terminal disposed on the second transparent electrode layer.

3. The 3D grating according to claim 2, wherein the second transparent electrode layer is a plate-shaped electrode disposed at a light-exiting side of the first transparent electrode layer.

4. The 3D grating according to claim 3, wherein the at least one touch signal detecting terminal comprises four touch signal detecting terminals disposed at four corners of the plate-shaped electrode respectively.

5. The 3D grating according to claim 1, wherein the second transparent electrode layer comprises another pattern of strip-shaped electrodes, and orthographic projections of the strip-shaped electrodes of the second transparent electrode on the surface of the electrochromic material layer are overlapped with orthographic projections of the strip-shaped electrodes of the first transparent electrode on the surface of the electrochromic material layer respectively.

6. The 3D grating according to claim 5, wherein
   the at least one touch signal detecting terminal comprises four touch signal detecting terminals, which are disposed at either end of each of two outermost strip-shaped electrodes of the second transparent electrode layer respectively; and
   ends of the strip-shaped electrodes of the second transparent electrode layer located at the same side are electrically connected by a corresponding electrode wire to two of the touch signal detecting terminals at the side.

7. A color filter substrate, comprising a substrate and a color filter layer formed on the substrate, wherein
the color filter layer comprises a 3D grating formed on a light-exiting side of the color filter layer, the 3D grating being the 3D grating according to claim 1.

8. A method of manufacturing a 3D grating, comprising steps of:
forming a first transparent electrode layer;
forming an electrochromic material layer on the first transparent electrode layer; and
forming a second transparent electrode layer on the electrochromic material layer;
wherein the first transparent electrode layer comprises a pattern of strip-shaped electrodes, the pattern of strip-shaped electrodes comprising a plurality of strip-shaped electrodes and an electrode wire connected with the plurality of strip-shaped electrodes of the pattern of strip-shaped electrodes; and
wherein the electrochromic material layer is configured to be non-transparent when it is in an electric field and to be transparent when it is not in an electric field, or the electrochromic material layer is configured to be transparent when it is in an electric field and to be non-transparent when it is not in an electric field,
each of the first transparent electrode layer and the second transparent electrode layer comprises two patterns of strip-shaped electrodes, the strip-shaped electrodes of each of the patterns of strip-shaped electrodes being electrically connected by a corresponding electrode wire;
in each of the transparent electrode layers, the strip-shaped electrodes of one of the two patterns of strip-shaped electrodes and the strip-shaped electrodes of the other one of the two patterns of strip-shaped electrodes are alternately arranged; and
the strip-shaped electrodes in the first transparent electrode layer are perpendicular to the strip-shaped electrodes in the second transparent electrode layer.

9. The method according to claim 8, wherein the steps of forming the first transparent electrode layer, the electrochromic material layer and the second transparent electrode layer comprising:
forming a plurality of strip-shaped electrodes of the first transparent electrode layer;
depositing the electrochromic material layer on the first transparent electrode layer;
forming a plurality of strip-shaped electrodes of the second transparent electrode layer on the deposited electrochromic material layer;
forming an insulation material layer covering the first transparent electrode layer, the electrochromic material layer and the second transparent electrode layer;
etching off portions of the insulation material layer at positions where the electrode wires are to be formed in the second transparent electrode layer and etching off portions of the insulation material layer and portions of the electrochromic material layer at positions where the electrode wires are to be formed in the first transparent electrode layer, so as to form corresponding via holes for the electrode wires; and
depositing a metal material to file the via holes to obtain the electrode wires in the second transparent electrode layer and the electrode wires in the second transparent electrode layer.

10. The method according to claim 8, wherein the strip-shaped electrodes and the electrode wire in the same transparent electrode layer are formed simultaneously through the same process.

11. The method according to claim 8, wherein the first transparent electrode layer, the second transparent electrode layer and the electrochromic material layer are formed on the substrate through a patterning process.

12. A method of manufacturing a color filter substrate, comprising steps of:
forming a color filter layer on a substrate; and
forming a 3D grating on a light-exiting side of the color filter layer by the method according to claim 8.

13. A display device, comprising the color filter substrate according to claim 7.

14. A display control method for controlling the display device according to claim 13 to switch between a 2D display mode and a 3D display mode, the method comprising:
in the 3D display mode, controlling voltages applied on the first transparent electrode layer and the second transparent electrode layer, such that the whole electrochromic material layer presents transparent portions and non-transparent portions that are alternately distributed; and
in the 2D display mode, controlling the voltages applied on the first transparent electrode layer and the second transparent electrode layer, such that the whole electrochromic material layer becomes transparent.

15. The display control method according to claim 14, wherein
in the 3D display mode, a voltage applied on the electrode wire is controlled to generate an electric field between the second transparent electrode layer and the strip-shaped electrodes of the first transparent electrode layer, such that portions of the electrochromic material layer at position corresponding to the strip-shaped electrodes become non-transparent from transparent to form a grating pattern; and
in the 2D display mode, the voltage applied on the electrode wire is controlled such that no electric field is formed between the second transparent electrode layer and the strip-shaped electrodes of the first transparent electrode layer and thereby the whole electrochromic material layer becomes transparent.

16. The display control method according to claim 14, wherein
in the 3D display mode, a voltage applied on the electrode wire is controlled to generate an electric field between the second transparent electrode layer and the strip-shaped electrodes of the first transparent electrode layer, such that portions of the electrochromic material layer at positions corresponding to the strip-shaped electrodes become transparent from non-transparent to form a grating pattern; and
in the 2D display mode, the voltage applied on the electrode wire is controlled such that no electric field is formed between the second transparent electrode layer and the strip-shaped electrodes of the first transparent electrode layer and thereby the whole electrochromic material layer becomes transparent.

17. The display control method according to claim 14, wherein the display device comprises the 3D grating according to claim 1, and the display control method comprises:
controlling voltages applied on each of the electrode wires such that no electric field is generated between strip-shaped electrodes of one pattern of strip-shaped electrodes of one of the first and the second transparent electrode layers and strip-shaped electrodes of the two patterns of strip-shaped electrodes of the other one of the first and the second transparent electrode layers, and an electric field is generated between strip-shaped electrodes of the other pattern of strip-shaped electrodes of the one of the first and the second transparent electrode layers and strip-shaped electrodes of the two patterns of strip-shaped electrodes of the other one of the first and the second transparent electrode layers.

18. The display control method according to claim 17, further comprising:

demonstrating a viewing direction in which a user watches the display device in the 3D display mode;

determining the first transparent electrode layer as the one of the first and the second transparent electrode layers and the second transparent electrode layer as the other one of the first and the second transparent electrode layers, when the viewing direction is consistent with a length direction of the strip-shaped electrodes of the first transparent electrode layer; and determining the second transparent electrode layer as the one of the first and the second transparent electrode layers and the first transparent electrode layer as the other one of the first and the second transparent electrode layers, when the viewing direction is consistent with a length direction of the strip-shaped electrodes of the second transparent electrode layer.

\* \* \* \* \*